US009229088B2

(12) United States Patent
Cheng et al.

(10) Patent No.: US 9,229,088 B2
(45) Date of Patent: Jan. 5, 2016

(54) DEVICE, SYSTEM AND METHOD FOR IDENTIFYING WIRELESS APPARATUS

(71) Applicant: Industrial Technology Research Institute, Hsinchu (TW)

(72) Inventors: Ming-Hsuan Cheng, Hsinchu (TW); Ping-Fan Ho, Hsinchu (TW); Yin-Chih Lu, Hsinchu (TW); Ming-Fong Tsai, Hsinchu (TW)

(73) Assignee: INDUSTRIAL TECHNOLOGY RESEARCH INSTITUTE, Chutung Township, Hsinchu County (TW)

( * ) Notice: Subject to any disclaimer, the term of this patent is extended or adjusted under 35 U.S.C. 154(b) by 199 days.

(21) Appl. No.: 14/185,406

(22) Filed: Feb. 20, 2014

(65) Prior Publication Data

US 2014/0274124 A1    Sep. 18, 2014

(30) Foreign Application Priority Data

Mar. 15, 2013 (TW) .............................. 102109165 A

(51) Int. Cl.
*H04W 24/00* (2009.01)
*G01S 5/00* (2006.01)
(Continued)

(52) U.S. Cl.
CPC ............ *G01S 5/0072* (2013.01); *G01S 5/0289* (2013.01); *H04W 64/00* (2013.01); *G01S 7/003* (2013.01); *G01S 2013/9325* (2013.01)

(58) Field of Classification Search
CPC .......... G01S 2013/9325; G01S 5/0072; G01S 5/0289; G01S 7/003; H04W 64/00
USPC ........ 455/404.1–414.2, 418–422.1, 448, 450, 455/452.2, 456.1, 456.2, 456.3, 456.6–457, 455/550.1, 569.2, 99, 67.11, 152.1, 238.1; 370/328, 338, 395.31, 331; 340/902, 340/904, 992; 701/300, 28, 36, 301, 213
See application file for complete search history.

(56) References Cited

U.S. PATENT DOCUMENTS

| 6,234,585 B1 | 5/2001 | Harris et al. |
| 7,400,909 B2 | 7/2008 | Konishi et al. |

(Continued)

FOREIGN PATENT DOCUMENTS

| CN | 102334147 A | 1/2012 |
| JP | 2006-279960 A | 10/2006 |

(Continued)

OTHER PUBLICATIONS

Jazayeri et al., "Vehicle Detection and Tracking in Car Video Based on Motion Model," IEEE Trans. on Intelligent Transportation Systems, vol. 12, No. 2, pp. 583-595 (Jun. 2011).

(Continued)

*Primary Examiner* — Babar Sarwar
(74) *Attorney, Agent, or Firm* — Muncy, Geissler, Olds & Lowe, P.C.

(57) ABSTRACT

The present disclosure provides an identifying device, an identifying system and a method for identification between a transmitting wireless apparatus and a receiving wireless apparatus, wherein the transmitting wireless apparatus senses a plurality of wireless apparatuses to provide sense information, calculate relative location information between the transmitting wireless apparatus and the wireless apparatuses based on the sense information and convert the relative location information into an identification datum. The transmitting wireless apparatus transmits a broadcast message having the identification datum. When the receiving wireless apparatus receives the broadcast message from the transmitting wireless apparatus, the identification information of the broadcast message is compared with sense information sensed by the receiving wireless apparatus. When the error value between the identification information and the sense information sensed by the receiving wireless apparatus is less than a permissible value, the receiving wireless apparatus is determined as an object receiving the broadcast message.

17 Claims, 7 Drawing Sheets

(51) Int. Cl.
*G01S 5/02* (2010.01)
*H04W 64/00* (2009.01)
*G01S 7/00* (2006.01)
*G01S 13/93* (2006.01)

(56) References Cited

U.S. PATENT DOCUMENTS

| | | | |
|---|---|---|---|
| 7,894,407 B2 | 2/2011 | Lin et al. | |
| 8,149,135 B2 | 4/2012 | Wagenhuber et al. | |
| 8,169,338 B2 * | 5/2012 | Mudalige | G08G 1/163 340/438 |
| 8,229,668 B2 | 7/2012 | Kawauchi et al. | |
| 8,239,086 B2 | 8/2012 | Higgins-Luthman | |
| 2003/0028294 A1 * | 2/2003 | Yanagi | G01S 7/22 701/21 |
| 2003/0155470 A1 * | 8/2003 | Young | A63H 19/24 246/122 A |
| 2010/0019891 A1 | 1/2010 | Mudalige | |
| 2010/0138140 A1 * | 6/2010 | Okuyama | G08G 1/096822 701/117 |
| 2010/0286864 A1 * | 11/2010 | Kawauchi | G01S 5/0072 701/31.4 |
| 2010/0302022 A1 * | 12/2010 | Saban | B60N 2/002 340/459 |
| 2011/0141282 A1 * | 6/2011 | Notsu | G08G 1/04 348/149 |
| 2011/0301844 A1 * | 12/2011 | Aono | G01S 13/931 701/300 |
| 2012/0019674 A1 | 1/2012 | Ohnishi et al. | |
| 2012/0095646 A1 * | 4/2012 | Ghazarian | G01S 19/17 701/36 |

FOREIGN PATENT DOCUMENTS

| | | |
|---|---|---|
| TW | 200833006 A | 8/2008 |
| TW | 201112133 A | 4/2011 |
| TW | 1356011 B1 | 1/2012 |

OTHER PUBLICATIONS

Yang et al., "Technology of Vehicle Identification Based on Laser Radar," 2011 Third Int'l Conf. on Intel. Human-Mach. Systems and Cybernetics, pp. 160-164 (Aug. 2011).

Dissanayake et al., "Zigbee Wireless Vehicular Identification and Authentication System," Info. and Automation for Sustainability (ICIAFS) 4th Int'l Conf., pp. 257-260 (2008).

Gandhi et al., "Vehicle Surround Capture: Survey of Techniques and a Novel Omni-Video-Based Approach for Dynamic Panoramic Surround Maps," IEEE Trans. on Intelligent Transportation Systems, vol. 7, No. 5, pp. 293-308 (Sep. 2006).

Gandhi et al., "Video Based Surround Vehicle Detection, Classification and Logging from Moving Platforms: Issues and Approaches," 2007 IEEE Intel. Veh. Symp., pp. 1067-1071 (Jun. 2007).

Morris et al., "Vehicle Iconic Surround Observer: Visualization Platform for Intelligent Driver Support Applications," 2010 IEEE Intl. Veh. Symp., pp. 168-173 (Jun. 2010).

Chen et al., "Vision-based Nighttime Vehicle Detection and Range Estimation for Driver Assistance," 2008 IEEE Int'l Conf. on Systems, Man & Cybernetics, pp. 2988-2993 (Oct. 2008).

* cited by examiner

| Request Message |
|---|
| Transmission ID: 123456789 |
| Serial Number:0000001 |
| Transmission Time: 10:10:01 |
| V=30m/s ,a=0,ω=0,α=0 (optional) |
| From:AA-1111 |
| To:14.012m 45.123° |
| Sensing Time:10:10:00 |
| To:14.322m 100.223° |
| Sensing Time:10:10:00 |

| Reply Message |
|---|
| Transmission ID: 123456789 |
| Serial Number:0000001 |
| Transmission Time: 10:10:03 |
| V=30.1m/s ,a=0,ω=0,α=0 (optional) |
| From:BB-2222 |
| To:AA-1111 |
| 14.013m 225.121° (optional) |
| Sensing Time:10:10:01 (optional) |

DEVICE, SYSTEM AND METHOD FOR IDENTIFYING WIRELESS APPARATUS

CROSS-REFERENCE TO RELATED APPLICATIONS

This application claims priority to Taiwanese Patent Application No. 102109165, filed on Mar. 15, 2013. The entirety of the above-mentioned patent application is hereby incorporated by reference herein and made a part of this specification.

TECHNICAL FIELD

This disclosure relates to an identifying technique to an identifying device, an identifying system and a method that could identify a dynamic wireless apparatus.

BACKGROUND

With the advancement of technology and the improvement of network bandwidth and apparatus, communication via network is widespread. In network communication technique, whether a wired network or wireless network, two communication apparatus only aware network address or apparatus name of each other, the communication of two ends could be created. Such communication technique is quite mature and widely used. Most of the conventional communication apparatuses are fixed at the same place or use a single base station for centralized communication to the phone, usually by the use of IP and MAC address as the identification ID of communication, i.e., establishment of connection between communication apparatuses could achieve the identification purpose via identification ID such as IP and MAC address. In the wireless network environment, the communication apparatus is constantly moving and uses the distributed communication and broadcasting to send message. In the absence of other auxiliary positioning apparatus, the receiving end will not be able to correctly identify the relative location relationship of a transmitter with itself. It will cause issues when the application needs to know immediately the relative relationship of each other, such as the application of vehicle safety. In the collision avoidance application, a vehicle usually ought to continuously exchange traffic information with adjacent vehicles to maintain safety; however, the vehicles are constantly moving and therefore it is hard to know the right IP or MAC address of the adjacent vehicle at next time point. Moreover, it is impossible to transmit messages to adjacent vehicles with the IP or MAC address only as the identification ID, resulting in the situation that the moving communication apparatuses could not communicate and identify with each other. Currently, since wireless communication apparatuses could not obtain an IP or MAC address of a nearby wireless device in advance, GPS coordinates are used for identification, that is, the message accompanies the GPS positioning information. However, the existing GPS technique has a tolerance of 8 to 15 meters. In the circumstance that the body of a general vehicle is only 5 m and the width of a lane is 3.5 m, misjudgment will occur.

Therefore, it is an important issue to develop an identifying technique for a moving wireless communication apparatus, in the circumstance that the IP or MAC address could not be used only as the identification ID, the possible positioning tolerance of the GPS device needs to be eliminated, and also the adjacent moving device could be correctly identified.

SUMMARY

The present disclosure may provide an identifying device for a wireless apparatus that could identify an object receiving a broadcast message by determining relative location information of a plurality of wireless apparatus sensed by the wireless apparatus.

Furthermore, the present disclosure may provide an identifying system and method, in which a transmitting wireless apparatus transmits a broadcast message having the relative location information and a receiving wireless apparatus performs the identification.

The present disclosure may provide an identifying device for a wireless apparatus that may comprise a sensing unit, a processing unit, a storing unit and a wireless communication unit. The sensing unit may be used to sense a plurality of wireless apparatuses around the wireless apparatus to provide sense information. The processing unit may be used to calculate first relative location information between the wireless apparatus and the plurality of wireless apparatuses based on the sense information. The sense information and the first relative location information may be stored in the storing unit. The wireless communication unit may be used to receive a first broadcast message, which is transmitted from one of the plurality of wireless apparatuses and contains a first identification datum relating to second relative location information of the one of the plurality of wireless apparatuses. After the wireless communication unit receives the broadcast message, the processing unit may compare the identification datum in the first broadcast message with the first relative location information stored in the storing unit to calculate an error value. When the error value is less than a permissible value, the wireless apparatus may be determined as an object receiving the first broadcast message.

The present disclosure may further provide an identifying system for a wireless apparatus comprising a receiving wireless apparatus and a transmitting wireless apparatus. The receiving wireless apparatus may sense a first plurality of wireless apparatuses around it through a first sensing unit to provide first sense information stored in a first storing unit. Further, a first wireless communication unit of the receiving wireless apparatus may receive a broadcast message transmitted from the transmitting wireless apparatus, and a first processing unit in the receiving wireless apparatus may compare the identification datum of the broadcast message with the first sense information stored in the first storing unit to calculate an error value between the identification datum and the first sense information and determine that the receiving wireless apparatus is an object receiving the broadcast message when the error value is less than a permissible value. The transmitting wireless apparatus may sense a second plurality of wireless apparatuses around it through a second sensing unit to provide second sense information stored in a second storing unit. Subsequently, a second processing unit may calculate second relative location information between the transmitting wireless apparatus and the second plurality of wireless apparatuses based on the second sense information. The second relative location information may be converted into an identification datum and a second wireless communication unit may transmit a broadcast message having the identification datum.

The present disclosure may further provide a method for the identification between a receiving wireless apparatus and a transmitting wireless apparatus. The method may include the following steps. The receiving wireless apparatus and the transmitting wireless apparatus may sense a plurality of wireless apparatuses and provide first sense information and second sense information, respectively. The transmitting wireless apparatus may calculate second relative location information between the transmitting wireless apparatus and the plurality of wireless apparatuses based on the second sense information and convert the second relative location information into an identification datum. The transmitting wireless apparatus may transmit a broadcast message having the identification datum, and the receiving wireless apparatus may receive the broadcast message. The receiving wireless apparatus may compare the identification datum of the broadcast message with the first sense information sensed by the receiving wireless apparatus and calculate an error value of the identification datum and the first sense information. The receiving wireless apparatus may determine whether the error value is less than a permissible value. If the error value is less than the permissible value, the receiving wireless apparatus is an object receiving the broadcast message. Alternatively, if the error value is not less than the permissible value, the receiving wireless apparatus is not an object receiving the broadcast message.

Compared with the prior art, the present disclosure may provide an identifying device for a wireless apparatus. The wireless apparatus acquires the relative location information of a plurality of wireless apparatuses by way of sensing and comparing the relative location information with an identification datum upon receiving the identification datum from one of the plurality of wireless apparatuses, thereby determining which wireless apparatus is the object receiving a broadcast message. In addition, the present disclosure may further provide an identifying system and a method thereof. A transmitting wireless apparatus and a receiving wireless apparatus both sense a plurality of wireless apparatuses. The transmitting wireless apparatus may provide a broadcast message having an identification datum based on the sense information. Upon receiving the broadcast message by the receiving wireless apparatus, the identification datum of the broadcast message may be compared with the sense information sensed at the same time point, thereby determining whether the receiving wireless apparatus is the predetermined object receiving the broadcast message. Based on the device or method of the present application, the problem of the ID identification of the wireless apparatus in the moving state could be solved via sensing and comparing the relative location information by the wireless apparatus, even though there is no IP or MAC address used as the identification ID, or there is no GPS device, map or data assisting in positioning. A movable wireless apparatus is certainly applicable in a static state.

BRIEF DESCRIPTION OF DRAWINGS

The disclosure could be more fully understood by reading the following detailed description of the exemplary embodiments, with reference made to the accompanying drawings, wherein.

DETAILED DESCRIPTION

The following illustrative embodiments are provided to illustrate the disclosure of the present disclosure, these and other advantages and effects could be apparently understood by those in the art after reading the disclosure of this specification. The present disclosure could also be performed or applied by other different embodiments. The details of the specification may be on the basis of different points and applications, and numerous modifications and variations could be devised without departing from the spirit of the present disclosure.

TERM DEFINITION

It is to be understood that the terminology used herein is for the purpose of illustration only and is not intended to limit the present disclosure. The term "a" or "an" used herein is defined as one or more than one. The term "plurality" used herein is defined as two or more than two. The terms "including" and/or "having" used herein are defined as comprising (i.e., "open ended" phrase). The term "first" or "second" used herein is not intended to define the sequence of the elements or technical features of the present disclosure. Instead, the term "first" or "second" is used to allow a person skilled in the art to comprehend different technical features.

Figure 1:
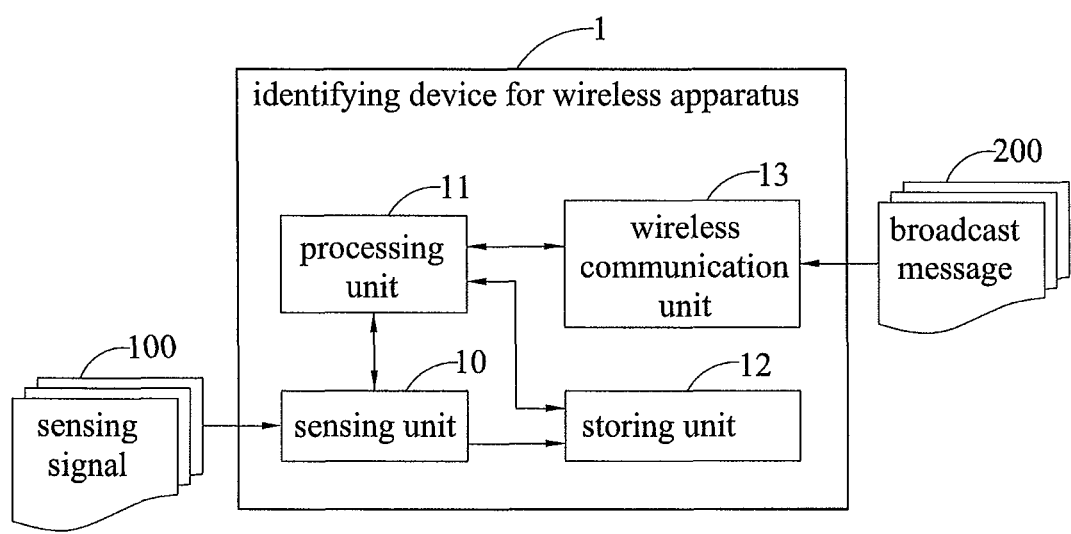
FIG. 1 is a schematic drawing of an identifying device for a wireless apparatus according to the present disclosure.

FIG. 1 is a schematic drawing of an identifying device for a wireless apparatus according to the present disclosure. As shown in FIG. 1, the identifying device 1 for the wireless apparatus acquires the relative location relationship via the sense information without a GPS device or auxiliary map positioning. The wireless apparatus may identify whether the received broadcast message is the broadcast message transmitted to it. The present disclosure may especially apply to a moving wireless apparatus. Certainly, a static wireless apparatus is applicable. The identifying device 1 for the wireless apparatus includes a sensing unit 10, a processing unit 11, a storing unit 12 and a wireless communication unit 13.

It should be noted that the wireless apparatus described herein could be the receiving end or the transmitting end. In other words, if the one transmitting a broadcast message is the transmitting end, the one receiving a broadcast message is the receiving end. Either a wireless apparatus as the receiving end or a wireless apparatus as the transmitting end may sense other wireless apparatuses around it and compare to determine whether it is the object receiving the broadcast message. The following will illustrate an example of a wireless apparatus as the receiving end.

The sensing unit 10 may be used for sensing a plurality of wireless apparatuses around the wireless apparatus to provide sense information. Specifically, the sensing unit 10 may sense the environment around it via (but not limited to) ultrasound, laser radar, infrared radar, millimeter-wave radar, image capture, short-range wireless sensing or optical communication. The sense signal 100 thus sensed is called sense information and the sense information may include at least a relative distance, an angle, time, heading or a speed.

The processing unit 11 may calculate the relative location information of the receiving end between the wireless apparatus and the plurality of wireless apparatuses based on the sense information acquired by the sensing unit 10. For the purpose of identification, the relative relationship between the wireless apparatus and the plurality of wireless apparatuses around should be acquired. Therefore, the processing unit 11 may calculate the sense information acquired by the sensing unit 10 to provide the relative location information of the receiving end.

The storing unit 12 may be used for storing the sense information from the sensing unit 10 and the relative location information of the receiving end from the processing unit 11. In this embodiment, the wireless apparatus acts as the receiving end, and thus the relative location information of the receiving end may be used for comparison and determination upon receiving a broadcast message.

The wireless communication unit 13 may be used for receiving a broadcast message 200 transmitted by one of the plurality of wireless apparatuses. The wireless communication unit 13 could use a wireless communicating technique including, but not limited to dedicated short range communication (DSRC), WI-FI, Bluetooth, radio frequency identification (RFID), optical communication, 3G, LTE, LTE-A, etc. The aforementioned broadcast message 200 may include the identification datum of the relative location information of the transmitting end of one of the plurality of wireless apparatuses. The identification datum may record the relative location information including a relative distance, an angle, time, heading or a speed. Once the wireless communication unit 13 receives the broadcast message 200, the processing unit 11 may compare the identification datum in the broadcast message 200 with the relative location information of the receiving end stored in the storing unit 12 to calculate an error value. The comparison described herein, specifically, means to compare the relative location relationship acquired from the transmitting end with the relative location relationship acquired from the receiving end and to determine whether two wireless apparatuses have a relative relationship in a sensing process. Therefore, if the error value is less than a predetermined permissible value, it could be determined that the wireless apparatus is the object receiving the broadcast message 200.

In addition, the processing unit 11 may be the controlling core of the identifying device 1 for the wireless apparatus. The processing unit 11 could control the wireless communication unit 13 in receiving and transmitting a message and could control the sensing unit 10 to perform sensing for objects around it.

Figure 2A:
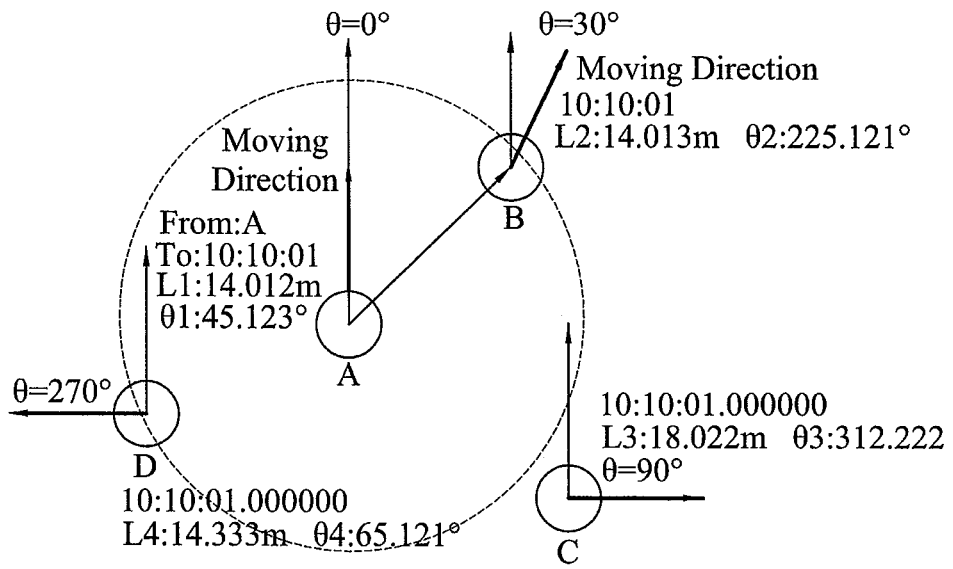
FIGS. 2A and 2B are schematic drawings showing an identifying device for a wireless apparatus respectively according to the embodiments of the present disclosure.
Figure 2B:
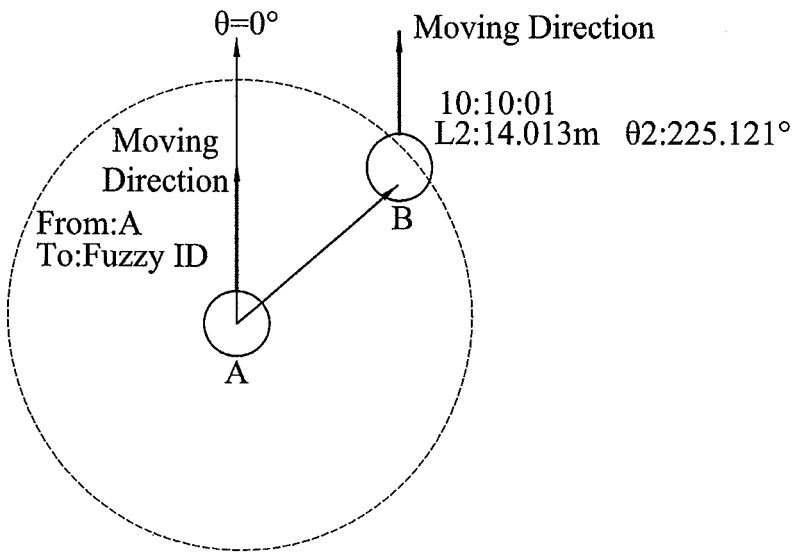

FIGS. 2A and 2B are schematic drawings showing the embodiments of an identifying device for a wireless apparatus respectively according to the present disclosure. The implementation of the aforementioned identifying device is described specifically, and the identification datum is further illustrated.

As shown in FIG. 2A, it is assumed that a moving device A moves toward the north (angle being 0° between the movement direction and the north), and a moving device B moves in a direction the angle of, which is 30° clockwise from the north. The two moving devices may move forward at the same speed V, and the moving devices A and B may be clock synchronization. The moving devices A and B may be respectively provided with identifying devices. The sensing units on the moving devices A and B may sense the relative distances, angles, etc of the objects around at a fixed time point. For example, at the time point of 10:10:01, the moving device A senses a distance L1 and an angle $\theta 1$ from the moving device B. For illustration, distance L1 is 14.012 m and the angle $\theta 1$ is 45.123°. The identifying device of the moving device A may integrate the sense information into an identification datum and transmits via a broadcast message. At the same time point of 10:10:01, the moving device B may sense a distance L2 of 14.013 m, and an angle $\theta 2$ of 255.121° from the moving device A. When the moving device B receives the broadcast message from the moving device A, the moving device B may compare the identification data of the moving devices A and B. The comparison may be determined by equations of ($|L1-Ln|<d1$) and ($180°-d2<|\theta 1-\theta n|<180°+d2$). In the equations, d1 is a permissible value for a distance error, and d2 is a permissible value for an angle error. For example, the speeds of the moving device A and the moving device B are both V, and thus only the relative relationship between the sensing distances (L1 and L2) or between the angles ($\theta 1$ and $\theta 2$) may be determined. d1 and d2 may provide permissible ranges defined by possible errors. d1 and d2 may vary based on the setting of the sensing units (such as sensing apparatuses) installed in the moving devices and the actual accuracy produced. The speed of the moving device may be acquired using a speed sensor, an OBD interface or a GPS device.

If the two relative identification data are subtracted and the thus obtained value is less than a permissive value, the moving device B is the object receiving the broadcast message by determining the thus obtained value. In short, as long as the moving device A and the moving device B individually sense the sense information at the same time point and they sense each other, the error value should not be too large. Thus, the sense information from the moving devices A and B at the same time point could be used as a basis for determining whether one of them may be the object receiving a broadcast message. If more than one possible outcome is appeared in the communication range, the one outcome could be acquired via comparing more than once or decreasing the error value.

To be more specific, the region around the moving device A may contain other moving devices, such as the moving devices C and D shown in FIG. 2A. The moving device C may move toward the east at the same speed of V, and sense a distance L3 of 18.022 m and an angle $\theta 3$ of 312.222° from the moving device A at the time point of 10:10:01. Since the moving device A is sensing the moving device B, the broadcast message transmitted by the moving device A is directed to the moving device B. Alternatively, the moving device A may also sense the moving devices C and D shown in FIG. 2A, the moving device A merely communicates with the moving device B. In this case, when the moving device C receives the broadcast message transmitted from the moving device A, the moving device C will compare data of the time point of 10:10:01. Since the distance and the angle are not within the error range, the moving device C will discard the received broadcast message. For example, the moving device C may determine whether itself is the object receiving a message. Assuming that the permissible value for a distance error d1 is 1 m and the permissible value for an angle error d2 is 5°, when the moving device C receives the broadcast message from the moving device A, the distance difference sensed by the moving devices A and C is 4.01 m by the equation of $|L1-L3|=|14.012-18.022|=4.01$. The distance difference of 4.01 m is significantly greater than the permissible value d1. Furthermore, the angle difference sensed between the moving devices A and C is about 267.099° by the equation of $|\theta 1-\theta 3|=|45.123-312.222|=267.099$. The angle difference of about 267° is significantly greater than the permissible value 180°+d2. Therefore, it could be determined that the moving device C is not the object to which the moving device A transmits a message. The moving device C will discard the broadcast message from the moving device A.

In addition, the moving device D moves toward the west in a speed of V and senses a distance L4 of 14.333 m and an angle θ4 of 65.121° from the moving device A at the time point of 10:10:01. Since the moving device A is sensing the moving device B, or the moving device A is also sensing the moving devices C and D but merely communicates with the moving device B, the broadcast message transmitted by the moving device A is directed to the moving device B. In this case, when the moving device D receives the broadcast message transmitted from the moving device A, the moving device D will compare data of the time point of 10:10:01. Although the distance is within the error range, the angle exceeds the error range. Therefore, the moving device D will discard the received broadcast message. For example, the moving device D may determine whether itself is the object receiving a message. Assuming that the permissible value d1 for a distance error is 1 m, the permissible value for an angle error d2 is 5°, when the moving device D receives the broadcast message of the moving device A, the distance difference sensed by the moving devices A and D is 0.321 m based on the equation of |L1−L4|. The distance difference is significantly less than the permissible value d1 which means that the moving device D meets the predetermined distance for the object sensed by the moving device A. However, the angle difference sensed between the moving devices A and D is about 20° based on the equation of |θ1−θ4|, which is less than the permissible value 180°−d2. Therefore, it could be determined that the moving device D is not the object to which the moving device A transmits a message. The moving device D will discard the broadcast message from the moving device A.

The aforementioned identification data belong to communication identification characters. Namely, the identification data may contain information such as values of relative distances and angles that could be plain codes or encoded digital characters. In addition, the identification datum could be a fuzzy identification character, which refers to any method that could represent a relative location range, such as a method representing a possible error. When a receiving end receives a broadcast message including a fuzzy identification character, the processing unit may decode the fuzzy identification character via the fuzzy identification character algorithm, thereby providing the relative location information and the possible range of the wireless apparatus transmitting the broadcast message. Afterward, the processing unit may compare the relative location information with the receiving end.

As shown in FIG. 2B, assuming that the moving devices A and B move toward the same direction (angle being 0° between the movement direction and the north) at the same speed of V and the moving devices A and B are clock synchronization, the moving devices A and B are respectively provided with sensing units that sense the relative distances, angles, etc of the object around them at a fixed time point. Information sensed by the identifying device of the moving device A, such as a distance L1 of 14.012 m and an angle θ1 of 45.123° at the time point of 10:10:01, may be converted into a fuzzy identification character (fuzzy ID) via the fuzzy identification character algorithm. The moving device B may sense a distance L2 of 14.013 m and an angle θ2 of 255.121° from the moving device A at the same time point of 10:10:01. When the moving device B receives the broadcast message from the moving device A, the fuzzy identification character will be decoded via the fuzzy identification character algorithm and fuzzily compared at time point of 10:10:01 to determine whether the result of the sensed relative position of an object is less than a permissible value and determine whether the moving device B is the receiving end For example, as shown in FIG. 2A, if the device A is trying to communicate with the device B via a communication identification character, a message could directly indicate that the receiving end is the one having the absolute time of 10:10:01, the relative distance of 14.012 m, and the relative angle of 45.123° by using a plain code. Thus, the communication identification character could be "T10:10:01L14.012A45.123" (T refers to absolute time, L refers to a relative distance, and A refers to a relative angle). For example, if the device A communicates with the device B by using the fuzzy identification character, the message could directly indicate that the receiving end is the one having a relative location and within a permissible range with a possible error by using a plain code. For example, the receiving end is the one having the absolute time of 10:10:01, within the relative distance range of 14.012±0.005 and within the relative angle range of 45.123±0.005, and thus the fuzzy identification character could be represented by "T10:10:01L14.012d.005A45.123d.005" (T refers to the absolute time, L refers to the relative distance, A refers to the relative angle, and d refers to the permissible range defined by a possible error). The above identification characters are possible examples and could also be encoded or encrypted with various conventional methods for keeping data fault tolerance or security.

Figure 3:
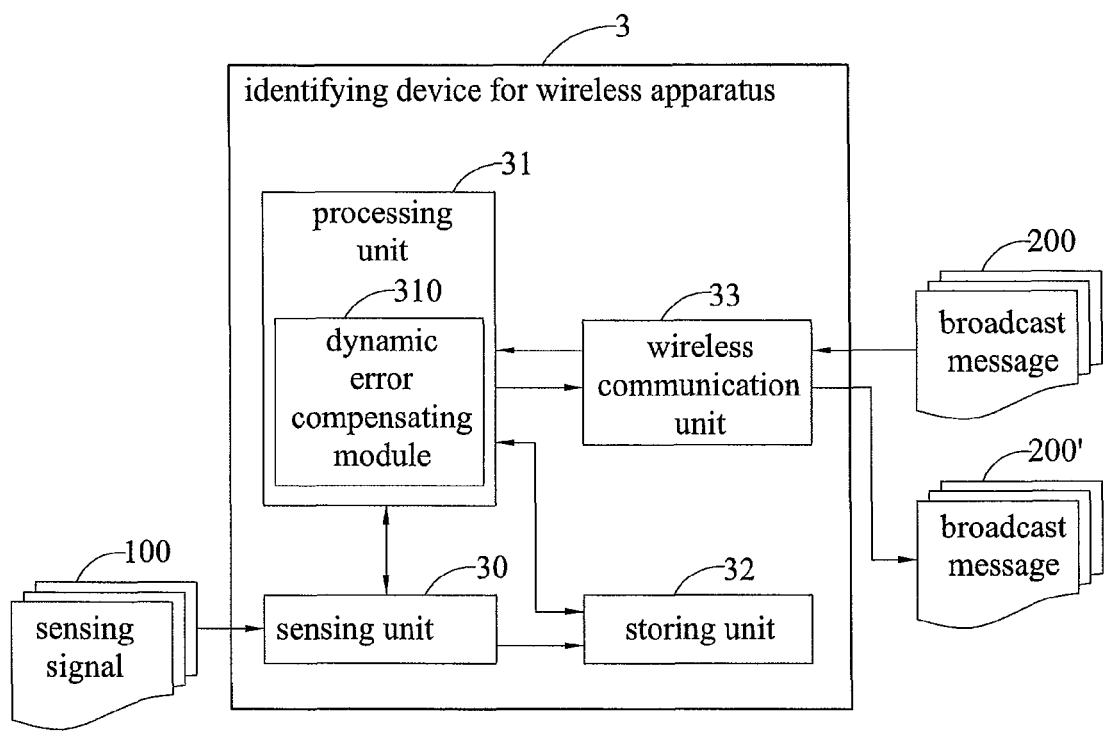
FIG. 3 is a schematic drawing showing an identifying device for a wireless apparatus according to another embodiment of the present disclosure.

FIG. 3 is a schematic drawing showing another embodiment of an identifying device for a wireless apparatus according to the present disclosure. In this embodiment, the identifying device 3 for the wireless apparatus may acquire the relative location relationship via the sense information without a GPS device or auxiliary map positioning. The wireless apparatus may identify whether the received broadcast message is the broadcast message transmitted to it. The sensing unit 30, the processing unit 31, the storing unit 32 and the wireless communication unit 33 of the identifying device 3 for the wireless apparatus have the same functions as the sensing unit 10, the processing unit 11, the storing unit 12 and the wireless communication unit 13 shown in FIG. 1, and will not described for more details herein. The differences between the present embodiment and FIG. 1 are that the processing unit 31 may provide a broadcast message 200', and the processing unit 31 may further comprise a dynamic error compensating module 310.

As previously described, the wireless apparatus could be the receiving end or the transmitting end. That is, when the wireless apparatus is the transmitting end, it could transmit the broadcast message 200'. In detail, the sensing unit 30 may sense the sense signal 100 to acquire the sense information, and the processing unit 31 may acquire the relative location information of the receiving end between the wireless apparatus and a plurality of wireless apparatuses based on the sense information. If the wireless apparatus is the transmitting end, the processing unit 31 may convert the relative location information of the receiving end into the identification datum of the wireless apparatus, and the identification datum will be transmitted via the wireless communication unit 33. That is, the broadcast message 200' has the identification datum of the wireless apparatus. From the foregoing, in addition to receiving a broadcast message 200 from an external wireless apparatus, each of the wireless apparatuses may also provide the broadcast message 200' of itself.

Figure 4A:
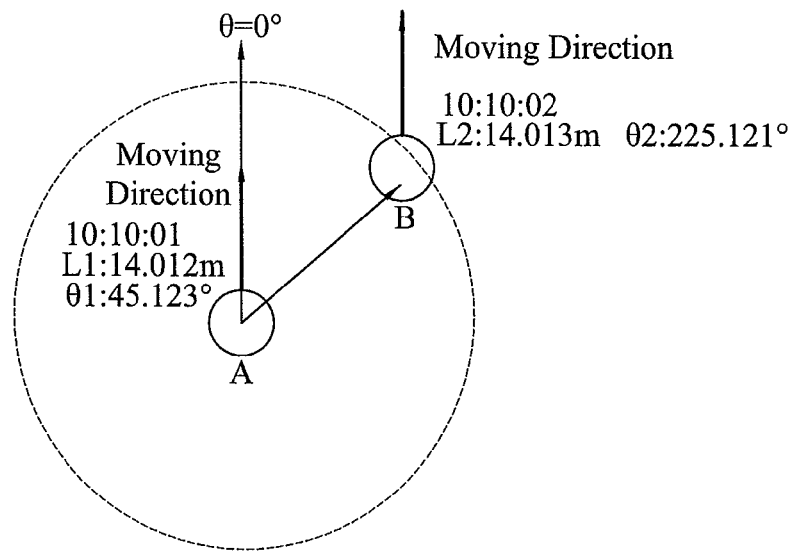
FIGS. 4A and 4B are schematic drawings each showing a dynamic error compensation method performed by an identifying device for a wireless apparatus according to the present disclosure.
Figure 4B:
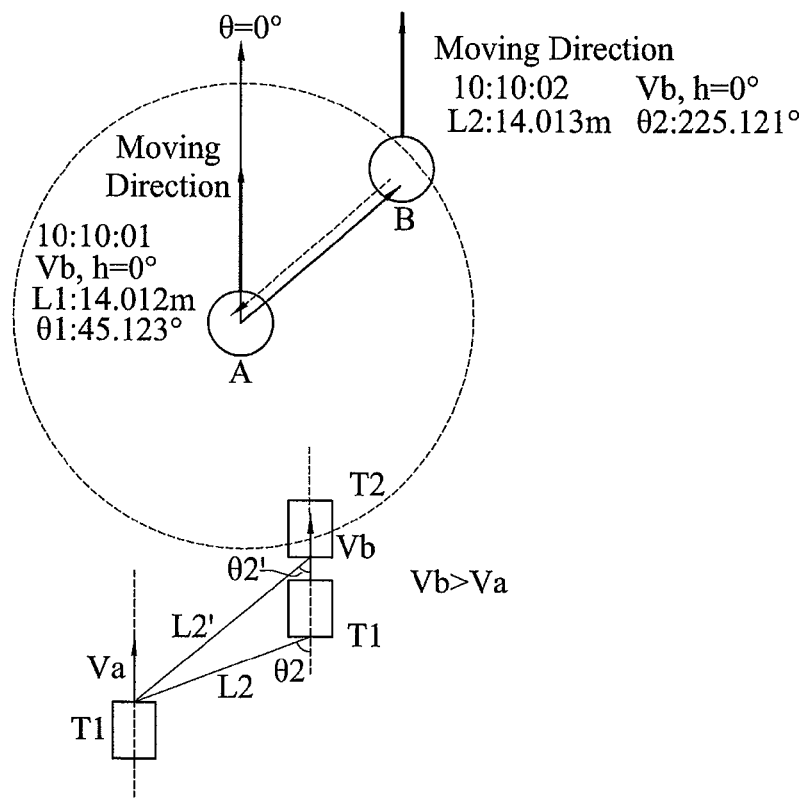

In addition, the dynamic error compensating module 310 of the processing unit 31 may compensate errors due to asynchronous moving. Specifically, when the time point of the relative location information of the receiving end sensed by the sensing unit 30 is different from the time point of the identification datum of the broadcast message 200 received, the dynamic error compensating module 310 may calculate the relative location information of the receiving end sensed by the sensing unit 30 to provide corrected relative location information corresponding to the time point of the identification datum of the broadcast message via interpolation, extrapolation or other possible estimating formulas. Thus, the processing unit 31 may compare the corrected relative location information with the identification datum of the broadcast message 200. It could be seen from the above that the dynamic error compensating module 310 may compensate the asynchronous sensing data caused by the two asynchronous moving devices. If the sensing time points are different, data at the same time point must be provided by the dynamic error compensating module 310 before comparison. If the non-synchronization due to different moving speeds of the moving devices, the dynamic error compensation module 310 may calculate data, which could be compared directly, via a time speed difference estimating method. FIGS. 4A and 4B respectively illustrate how to perform the dynamic error compensation.

As shown in FIG. 4A, it is assumed that the moving devices A and B move toward the same direction (angle being 0° between the movement direction and the north) at the same speed of V, and the moving devices A and B are time synchronization. The moving devices A and B are respectively provided with an identifying device. The sensing units of the moving devices A and B sense relative distances, angle, etc of objects around them at a fixed time point. At the time point of 10:10:01, the moving device A senses a distance L1 of 14.012 m and an angle θ1 of 45.123° from the moving device B. After the moving device B receives a broadcast message having relative location information that is at the time point of 10:10:00, a distance L2' of 14.013 m and an angle θ2' of 225.121° and another relative location information that is at the time point of 10:10:02, a distance L2'' of 14.012 m, an angle θ2'' of 225.122°, the dynamic error compensating module 310 of the processing unit 31 shown in FIG. 3 may perform the error compensation. Due to the same speed of the moving devices A and B, errors caused by different speeds do not need to be considered, and only the data at the same sensing time point may be considered. The dynamic error compensating module 310 may calculate the corrected relative location information by the interpolation θ2=(θ2'+θ2'')/2 and L2=(L2'+L2'')/2. For example, the corrected relative location information at the time point of 10:10:01 may be a distance L2 of 14.0125 m via L2=(L2'+L2'')/2 and an angle 2 of 225.1215° via θ2=(θ2'+θ2'')/2. The identifying device of the moving device B may subtract the two relative identification data by the processing unit and determine whether the moving device B is the object receiving the broadcast message by using the equations of (|L1−L2|<d1) and (180°−d2<|θ1−θ2|<180°+d2), wherein d1 is a permissible value for a distance error and d2 is a permissible value for an angle error. The method to determine an error is illustrated in FIGS. 2A and 2B, and will not be repeated here.

Moreover, when the time point of the relative location information of the receiving end sensed by the sensing unit 30 is different from the time point of the identification datum of the received broadcast message 200, the dynamic error compensating module 310 as illustrated in FIG. 3 may calculate the relative location information of the receiving end sensed by the sensing unit 30 to provide the corrected relative location information corresponding to the time point of the identification datum of the broadcast message 200 via the time speed difference estimating method, such that the processing unit 31 may compare the corrected relative location information with the identification datum of the broadcast message 200.

As shown in FIG. 4B, the error compensation mechanism for time and speed differences is illustrated. It is assumed that the moving devices A and B move toward the same direction (angle being 0° between the moving direction and the north) at the constant speeds Va and Vb, respectively, and the moving devices A and B are clock synchronization. The moving devices A and B are respectively provided with identifying devices. The sensing units of the moving devices A and B sense relative distances, angles, etc of the objects around them at a fixed time point. The moving device A senses a distance L1 of 14.012 m and an angle θ1 of 45.123° at the time point of 10:10:01 from the moving device B. Furthermore, the moving device B receives a broadcast message having relative location information that is a distance L2 of 14.013 m and an angle θ2 of 225.121° at the time point of 10:10:00. The corrected relative location information at the time point of 10:10:01 is estimated via the time-speed difference estimating method, such as $\theta2'=\tan^{-1}(L2\times\sin\theta2)/(L\times\cos\theta2+(Vb-Va)\times(T2-T1))$ and $L2'=(L2\times\cos\theta2+(Vb-Va)\times(T2-T1))/\cos\theta2$. For example, since the speed Vb of the moving device B is greater than the speed Va of the moving device A, the moving device B moves faster than the moving device A. Therefore, the data sensed by the moving device B at the time point of T1 only will result in a wrong determination. Such asynchronous sense information of the moving devices A and B may be error-compensated via the dynamic error compensating module 310. The possible distance and angle may be calculated by considering the factor of speed. The dynamic error compensating module 310 may calculate a distance L2' via $L2'=(L2\times\cos\theta2+(Vb-Va)\times(T2-T1))/\cos\theta2$ and an angle θ2' via $\theta2'=\tan^{-1}(L2\times\sin\theta2)/(L\times\cos\theta2+(Vb-Va)\times(T2-T1))$. In other words, if the L2 and θ2 acquired from the moving device B at the time point of T1 only, it will result in miscalculation. Therefore, the factors of Va and Vb may be considered to provide L2' and θ2' of the moving device B at the time point of T2. This corrected relative location information is the relative identification datum for determination. Next, the identifying device of the moving device B may subtract the two relatively identification data via the processing unit and determine whether the moving device B is the object receiving a broadcast message by the equations of (|L1−L2'|<d1) and (180°−d2<|θ1−θ2'|<180°+d2), wherein d1 is a permissible value for a distance error, and d2 is a permissible value for an angle error. Similarly, the method to determine an error is illustrated in FIGS. 2A and 2B, and will not be repeated here.

Figure 5:
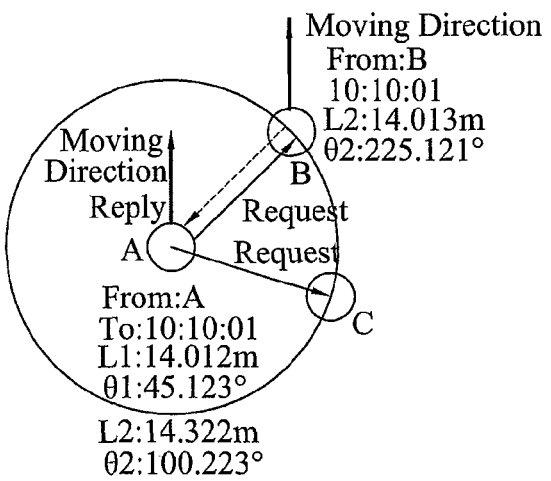
FIG. 5 is a schematic drawing for the message format in an identifying device for a wireless apparatus according to the present disclosure.

FIG. 5 is a schematic drawing for the message format in an identifying device for a wireless apparatus according to the present disclosure. As shown in FIG. 5, the message format of the broadcast message transmitted by the wireless apparatus is illustrated. At the time point of 10:10:01, the moving device A may sense the distance L1 of 14.012 m and the angle θ1 of 45.123° from the moving device B. The moving device B may sense the distance L2 of 14.013 m and the angle θ2 of 225.121° from the moving device A. The left side of the FIG. 5 provides the transferred request message and reply message. The request message transmitted by the moving device A may record that it is from AA-1111 (may be a license plate number, engine number, driver identity identification or other specific number representing the moving device), and is to be transmitted to a receiver with the distance of 14.012 m and the angle of 45.123° and the receiver with the distance of 14.322 m and the angle of 100.223°. The moving device B may receive the request message and return a reply message after the comparison is correct. The reply message may record that it is from BB-2222 and is to be transmitted to the AA-1111. Thus, according to the request message, the transmitter, from which the request message is transmitted, is identified. Similarly, if the moving device A senses a plurality of sense information or receives a plurality of request messages and the moving device A intends to transmit messages to a plurality of wireless devices around it (such as other moving devices around), the identification data of the plurality of the receiving moving device may be written in the request message via the processing unit 31 shown in FIG. 3. For example, if a request message of "to the distance of 14.012 m and the angle of 45.123°" is to be transmitted to the moving device B and other moving devices, a column identifying these objects to be transmitted may be increased, so as to achieve the one-to-many communication. For example, in addition to the message of "to the distance of 14.012 m and the angle of 45.123°" transmitting to the moving device B, the request message issued by the moving device A may also record the message of "to the distance of 14.322 m and the angle of 100.223°" transmitting to the moving device C. If other transmitting objects are added, the message of "to the distance of ○m, the angle of ○° and the sensing time" may be added in the request message, in which ○ is optionally selected, thereby increasing the objects to be transmitted. Therefore, when the moving device C receives the request message issued from the moving device A and confirms that it is the one receiving the request message after comparison, the request message is stored and processed, and then a reply message is returned (not shown).

Figure 6:
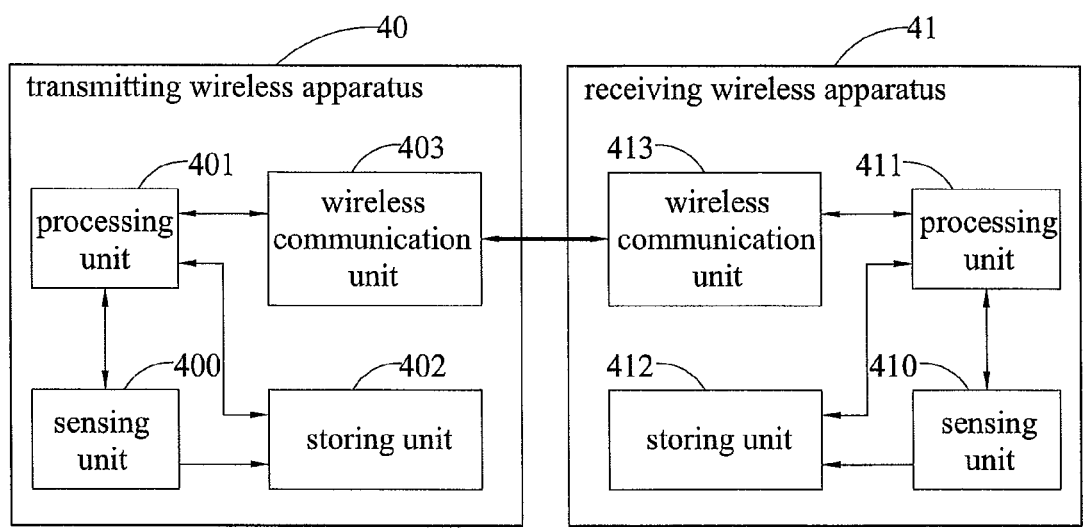
FIG. 6 is a schematic drawing showing a transmitting wireless apparatus and a receiving wireless apparatus according to the present disclosure.

Furthermore, the present disclosure provides an identifying system for a wireless apparatus. FIG. 6 is a schematic drawing showing a transmitting wireless apparatus and a receiving wireless apparatus according to the present disclosure.

Referring to FIG. 6, the identifying system 4 may comprise the transmitting wireless apparatus 40 and the receiving wireless apparatus 41. The transmitting wireless apparatus 40 and the receiving wireless apparatus 41 may perform identification via the sense information based on the identification technique of the present disclosure.

The transmitting wireless apparatus 40 may comprise the sensing unit 400, the processing unit 401, the storing unit 402 and the wireless communication unit 403. The sensing unit 400 may be used for sensing a plurality of wireless apparatuses (such as the wireless apparatus 41) around the transmitting wireless apparatus 40 to provide the transmitting sense information. The transmitting sense information is stored in the storing unit 402. The processing unit 401 may calculate the relative location information of the transmitting end between the transmitting wireless apparatus 40 and other wireless apparatuses based on the transmitting sense information of the storing unit 402. The relative location information of the transmitting end may be converted into an identification datum. The wireless communication unit 403 may transmit a broadcast message having the identification datum.

The receiving wireless apparatus 41 includes the sensing unit 410, the processing unit 411, the storing unit 412 and the wireless communication unit 413. The sensing unit 410 may be used for sensing a plurality of wireless apparatuses (such as the wireless apparatus 40) around the receiving wireless apparatus 41 to provide the receiving sense information. The receiving sense information is stored in the storing unit 412. The wireless communication unit 413 may receive the broadcast message transmitted from the transmitting wireless apparatus 40. The processing unit 411 may compare the identification datum of the received broadcast message with the sense information of the receiving end stored in the storing unit 412 and may calculate the error value between the identification datum and the sense information of the receiving end. When the error value is less than a permissible value, it is determined that the receiving wireless apparatus 41 is the object receiving the broadcast message.

The identification datum of the foregoing broadcast message may be a fuzzy identification character or a communication identification character. The communication identification character may record data such as a relative distance and an angle, etc. The fuzzy identification character may be calculated by the processing unit via the fuzzy identification character algorithm to provide the relative location information of the transmitting wireless apparatus transmitting the broadcast message. According to the result of the comparison, it is determined whether the receiving end is the predetermined receiver.

It should be noted that the receiving wireless apparatus 41 may also sense objects around via the sensing unit 410. The thus obtained sense information may be converted into the broadcast message of the wireless apparatus 41. In other words, the transmitting wireless apparatus 40 and the receiving wireless apparatus 41 may be interchangeable. Each of wireless apparatuses may receive the broadcast message and transmit the broadcast message provided by itself.

Figure 7:
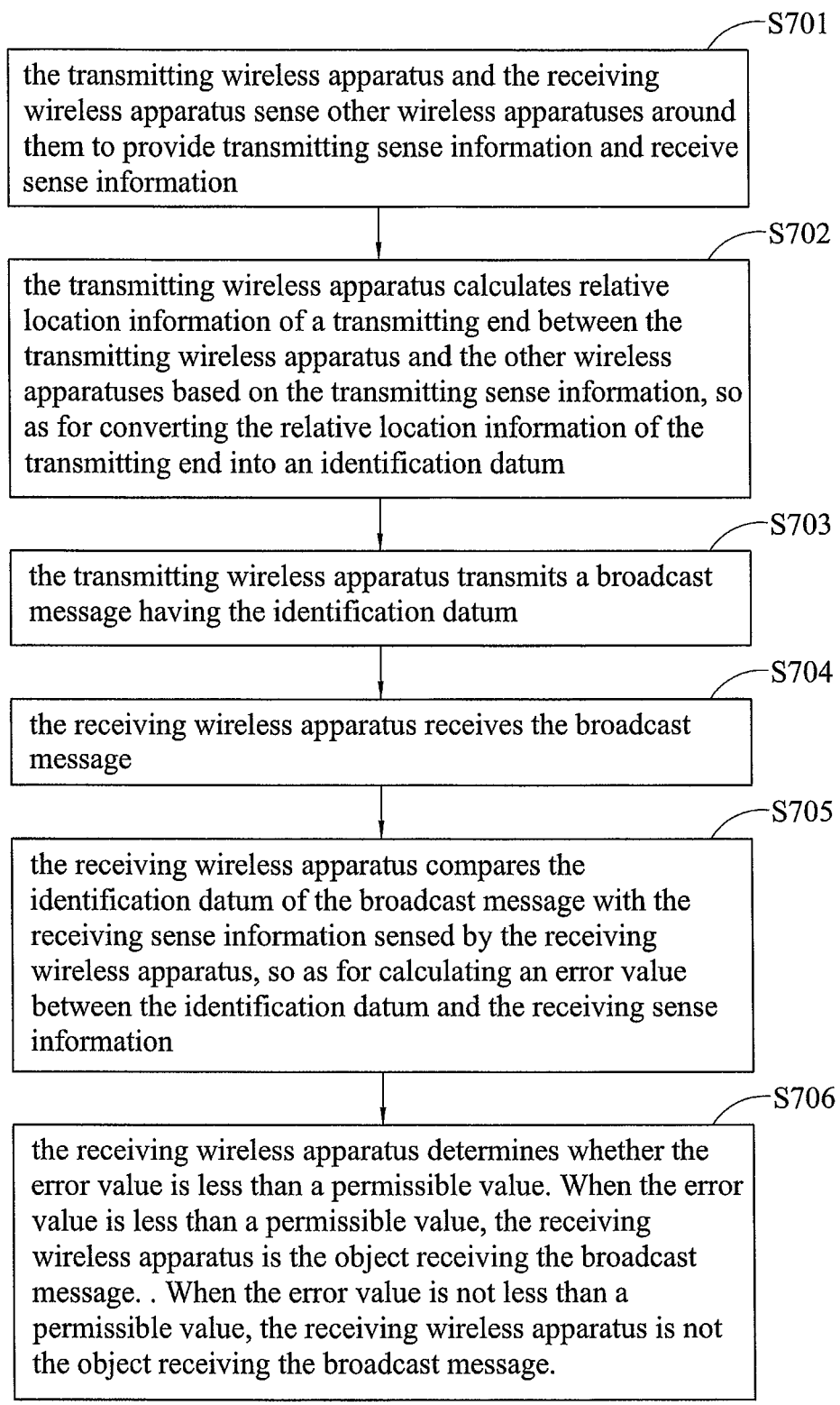
FIG. 7 is a schematic flow chart showing an identifying method used in a wireless apparatus according to the present disclosure.

FIG. 7 is a schematic flow chart showing an identifying method used in a wireless apparatus according to the present disclosure. As shown in FIG. 7, in step S701, a transmitting wireless apparatus and a receiving wireless apparatus may sense other wireless apparatuses around them to provide transmitting sense information and receiving sense information. That is, the transmitting wireless apparatus and the receiving wireless apparatus both may sense external objects, and the relative location information at least may comprise a relative distance, an angle, time, heading and a speed. Then, step S702 is proceeded.

In step S702, the transmitting wireless apparatus may calculate the relative location information of a transmitting end between the transmitting wireless apparatus and the other wireless apparatus based on the transmitting sense information, so as for converting the relative location information of the transmitting end into an identification datum. Specifically, the transmitting wireless apparatus may acquire the relative location information of the transmitting end between the transmitting wireless apparatus and other wireless apparatuses based on the sense information. The relative location information of the transmitting end may be converted into the identification datum, and the identification datum may be a fuzzy identification character or a communication identification character. Then, step S703 is proceeded.

In step S703, the transmitting wireless apparatus may transmit a broadcast message having the identification datum. The transmitting wireless apparatus may transmit the broadcast message having the identification datum for the receiving end, such that the receiving end may compare comparing the identification datum afterward. Then, step S704 is proceeded.

In step S704, the receiving wireless apparatus may receive the broadcast message. That is, the transmitting wireless apparatus may transmit the broadcast message, and other wireless apparatuses may also transmit broadcast messages at the same time. Thus, the receiving wireless apparatus may receive the broadcast messages from different transmitting wireless apparatuses. For example, as shown in FIG. 2A, the moving devices A, B, C and D may transmit broadcast messages and the moving device A may receive the broadcast messages from the moving devices B, C and D within a reasonable range (according to the capacity of the sensing apparatus). As for the method for transmitting the broadcast message to a plurality of wireless devices around, please refer to FIG. 5. Then, step S705 is proceeded.

In step S705, the receiving wireless apparatus may compare the identification datum of the broadcast message with the receiving sense information sensed by the receiving wireless apparatus, so as for calculating an error value between the identification datum and the receiving sense information. In detail, after the receiving wireless apparatus receives the broadcast message, the sense information of the receiving end may be compared and the error value may be calculated. Then, step S706 is proceeded.

In step S706, the receiving wireless apparatus may determine whether the error value is less than a permissible value. When the error value is less than a permissible value, the receiving wireless apparatus is the object receiving the broadcast message. When the error value is not less than a permissible value, the receiving wireless apparatus is not the object receiving the broadcast message. From the foregoing, when the error value is less than a predetermined permissible value, the receiving wireless apparatus is the object receiving the broadcast message. On the contrary, when the receiving wireless apparatus is not the predetermined object receiving the broadcast message, the receiving wireless apparatus will ignore the broadcast message.

In addition, in step S705, a step for compensating a dynamic error between the transmitting wireless apparatus and the receiving wireless apparatus under the situation where the time difference or speed difference is present via a dynamic error compensation method may be included. Namely, via the dynamic error compensation, the time difference or speed difference caused by two asynchronous wireless apparatus may be compensated as illustrated in FIGS. 4A and 4B.

In addition, in step S706, if the receiving wireless apparatus is the object receiving the broadcast message, the receiving wireless apparatus may transmit a reply message for communicating with the transmitting wireless apparatus. That is, when it is confirmed that the receiving wireless apparatus is the object receiving the broadcast message, the reply message may be returned, so as to communicate with the transmitting wireless apparatus.

In summary, the present disclosure provides an identifying device, an identifying system and a method for identification between a transmitting wireless device and a receiving wireless device. The transmitting wireless apparatus and the receiving wireless apparatus both could perform sensing. The receiving end receives the broadcast message of the transmitting end, and the identification datum of the broadcast message is compared with the sense information sensed at the same time point, so as to determine whether the receiving end is the predetermined object receiving the broadcast message. By the present disclosure, the identification problem where there is no IP or MAC address as communicating identification ID or no GPS device or data for used in positioning could be avoided. In other words, the identification problem for a moving wireless communication device could be solved. The present disclosure may be applied to message delivery and device identification of a variety of movable device communication, vehicle communication, and vehicle collaborative security.

The foregoing descriptions of the detailed embodiments are only illustrated to disclose the features and functions of the present disclosure and not restrictive of the scope of the present disclosure. It should be understood to those in the art that all modifications and variations according to the spirit and principle in the disclosure of the present disclosure should fall within the scope of the appended claims.

What is claimed is:

1. An identifying device for a wireless apparatus, comprising:
    a sensing unit for sensing a plurality of wireless apparatuses around the wireless apparatus to provide sense information;
    a processing unit for calculating first relative location information between the wireless apparatus and the plurality of wireless apparatuses based on the sense information;
    a storing unit for storing the sense information and the first relative location information; and
    a wireless communication unit for receiving a first broadcast message, which is transmitted from one of the plurality of wireless apparatuses and contains first identification datum relating to second relative location information of the one of the plurality of wireless apparatuses,
    wherein the processing unit compares the identification datum in the first broadcast message with the first relative location information stored in the storing unit to calculate an error value, and when the error value is less than a permissible value, the wireless apparatus is determined as an object receiving the first broadcast message.

2. The identifying device of claim 1, wherein the first identification datum contained in the first broadcast message is a fuzzy identification character or a communication identification character.

3. The identifying device of claim 2, wherein the fuzzy identification character is calculated by the processing unit via a fuzzy identification character algorithm to provide the second relative location information of the one of the plurality of wireless apparatuses and compares the second relative location information with the first relative location information.

4. The identifying device of claim 1, wherein the sense information is acquired by the sensing unit via ultrasound, laser radar, infrared radar, millimeter-wave radar, image capture, short-range wireless sensing or optical communication.

5. The identifying device of claim 1, wherein a wireless communicating technique selected from the group consisting of dedicated short range communication (DSRC), WI-FI, Bluetooth, 3G/LTE/LTE-A, optical communication, radio frequency identification (RFID) and optical communication is used by the wireless communication unit.

6. The identifying device of claim 1, wherein the second relative location information or the first relative location information comprises a relative distance, an angle, time, heading or a speed.

7. The identifying device of claim 1, wherein a second identification datum corresponding to the wireless apparatus based on the first relative location information is provided by the processing unit, and a second broadcast message having the second identification datum is transmitted by the wireless communication unit.

8. The identifying device of claim 1, wherein the processing unit further comprises a dynamic error compensating module, and when a time point of the first relative location information is different from a time point of the first identification datum of the first broadcast message, the first relative location information is calculated by the dynamic error compensating module to provide corrected relative location information corresponding to the time point of the first identification datum of the first broadcast message, such that a comparison between the corrected relative location information and the first identification datum of the first broadcast message is performed by the processing unit.

9. The identifying device of claim 8, wherein when the time point of the first relative location information is different from the time point of the first identification datum of the first broadcast message, the first relative location information is calculated by the dynamic error compensating module to provide the corrected relative location information corresponding to the time point of the first identification datum of the first broadcast message through time speed difference estimation, such that the comparison between the corrected relative location information and the first identification datum of the first broadcast message is performed by the processing unit.

10. An identifying system for a wireless apparatus, comprising:
a receiving wireless apparatus, comprising:
a first sensing unit for sensing a first plurality of wireless apparatuses around the receiving wireless apparatus to provide first sense information stored, and storing the first sense information in a first storing unit;
a first wireless communication unit for receiving a broadcast message transmitted from a transmitting wireless apparatus; and
a first processing unit for comparing an identification datum of the broadcast message with the first sense information stored in the first storing unit, calculating an error value between the identification datum and the first sense information and determining that the receiving wireless apparatus is an object receiving the broadcast message when the error value is less than a permissible value; and
a transmitting wireless apparatus, comprising:
a second sensing unit for sensing a second plurality of wireless apparatuses around the transmitting wireless apparatus to provide second sense information, and storing the second sense information in a second storing unit;
a second processing unit for calculating second relative location information between the transmitting wireless apparatus and the second plurality of wireless apparatuses based on the second sense information and converting the second relative location information into an identification datum; and
a second wireless communication unit for transmitting the broadcast message having the identification datum.

11. The identifying system of claim 10, wherein the identification datum is a fuzzy identification character or a communication identification character.

12. The identifying system of claim 11, wherein the fuzzy identification character is calculated by the first processing unit via a fuzzy identification character algorithm to provide the second relative location information of the transmitting wireless apparatus transmitting the broadcast message, and a comparison between the second relative location information and a first relative location information is performed by the first processing unit.

13. A method for identification between a receiving wireless apparatus and a transmitting wireless apparatus, comprising:
sensing a plurality of wireless apparatuses and providing first sense information and second sense information, respectively, by the receiving wireless apparatus and the transmitting wireless apparatus;
calculating second relative location information between the transmitting wireless apparatus and the plurality of wireless apparatuses based on the second sense information and converting the second relative location information into an identification datum by the transmitting wireless apparatus;
transmitting a broadcast message having the identification datum by the transmitting wireless apparatus;
receiving the broadcast message by the receiving wireless apparatus;
comparing the identification datum of the broadcast message with the first sense information sensed by the receiving wireless apparatus and calculating an error value of the identification datum and the first sense information by the receiving wireless apparatus; and
determining whether the error value is less than a permissible value by the receiving wireless apparatus,
wherein the receiving wireless apparatus is an object receiving the broadcast message when the error value is less than the permissible value, and the receiving wireless apparatus is not an object receiving the broadcast message when the error value is not less than the permissible value.

14. The method of claim 13, wherein the second relative location information comprises a relative distance, an angle, time, heading or a speed.

15. The method of claim 13, wherein the identification datum is a fuzzy identification character or a communication identification character.

16. The method of claim 13, further comprising:
compensating a dynamic error for a time difference or a speed difference between the transmitting wireless apparatus and the receiving wireless apparatus via a dynamic error compensation method.

17. The method of claim 13, wherein when the receiving wireless apparatus is the object receiving the broadcast message, a reply message is transmitted by the receiving wireless apparatus for communicating with the transmitting wireless apparatus.

* * * * *